United States Patent
Ducher

(10) Patent No.: US 12,169,087 B2
(45) Date of Patent: Dec. 17, 2024

(54) SYSTEMS AND METHODS FOR POWER CONTROL OF TRANSPORT REFRIGERATION SYSTEMS

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 76 days.

(21) Appl. No.: 17/810,004

(22) Filed: Jun. 30, 2022

(65) Prior Publication Data
US 2023/0030811 A1     Feb. 2, 2023

Related U.S. Application Data

(60) Provisional application No. 63/203,809, filed on Jul. 30, 2021.

(51) Int. Cl.
F25B 49/02     (2006.01)

(52) U.S. Cl.
CPC .................. F25B 49/02 (2013.01)

(58) Field of Classification Search
CPC ... F25B 49/02; B60H 1/00428; B60H 1/3222; B60H 1/3232
See application file for complete search history.

(56) References Cited

U.S. PATENT DOCUMENTS

| 5,896,750 A | 4/1999 | Karl | |
|---|---|---|---|
| 6,223,546 B1* | 5/2001 | Chopko | B60P 3/20 62/297 |
| 6,487,869 B1* | 12/2002 | Sulc | F04B 49/065 62/228.4 |
| 6,530,426 B1* | 3/2003 | Kishita | B60K 6/42 903/914 |
| 2015/0362205 A1* | 12/2015 | Hung | F24F 11/77 454/249 |
| 2016/0091235 A1* | 3/2016 | Umehara | F24F 11/37 62/160 |
| 2019/0299739 A1* | 10/2019 | Pourcheresse | B60P 3/20 |
| 2020/0130473 A1 | 4/2020 | Schumacher et al. | |
| 2020/0300530 A1* | 9/2020 | Kim | F25D 17/08 |

FOREIGN PATENT DOCUMENTS

WO     2015065643 A1     5/2015
WO     WO 2015-065643     *     5/2015

OTHER PUBLICATIONS

EP Application No. 22184471.5, Search Report, Dec. 20, 2022, 8 pages.

* cited by examiner

*Primary Examiner* — Henry T Crenshaw
(74) *Attorney, Agent, or Firm* — Souad Hakim

(57) ABSTRACT

A transport refrigeration system is disclosed. The transport refrigeration system comprises a refrigeration unit. The refrigeration unit comprises one or more components. The transport refrigeration system comprises an electric motor operatively connected to a power source. The electric motor is configured to provide power to the one or more components of the refrigeration unit. The refrigeration unit comprises a controller operatively connected with the electric motor and the one or more components of the refrigeration unit. The controller is configured to generate a control signal to convert the electric motor to an electric generator; and direct power to the one or more components.

13 Claims, 3 Drawing Sheets

SYSTEMS AND METHODS FOR POWER CONTROL OF TRANSPORT REFRIGERATION SYSTEMS

CROSS REFERENCE TO A RELATED APPLICATION

The application claims the benefit of U.S. Provisional Application No. 63/203,809 filed Jul. 30, 2021, the contents of which are hereby incorporated in their entirety.

BACKGROUND

The invention relates generally to transport refrigeration systems and, more specifically, to power control of transport refrigeration systems.

Generally, refrigerated cargo trucks or refrigerated tractor trailers (such as those utilized to transport cargo via sea, rail, or road, is a truck, trailer, or cargo container) include a refrigeration system located at one end of the truck, trailer, or cargo container. The refrigeration systems typically include a refrigeration unit and power unit to provide power to the refrigeration unit. Typically, the power unit include an electric motor.

BRIEF DESCRIPTION

Aspects of the disclosure relate to methods, apparatuses, and/or systems for power control of transport refrigeration systems.

In some embodiments, a transport refrigeration system is provided. The transport refrigeration system comprises a refrigeration unit. The refrigeration unit comprises one or more components. The transport refrigeration system comprises an electric motor operatively connected to a power source. The electric motor is configured to provide power to the one or more components of the refrigeration unit. The refrigeration unit comprises a controller operatively connected with the electric motor and the one or more components of the refrigeration unit. The controller is configured to generate a control signal to convert the electric motor to an electric generator; and direct power to the one or more components.

In some embodiments, the controller is configured to direct the power generated by the electric motor directly to the one or more components of the refrigeration unit.

In some embodiments, the controller is configured to direct variable power to the one or more components based on a power requirement of the one or more components.

In some embodiments, the refrigeration unit comprises a remote evaporator. The remote evaporator comprises an evaporator fan and an evaporator heater. The controller is configured to direct a first power to the evaporator fan and a second power to the evaporator heater.

In some embodiments, the controller is configured such that the first power directed to the evaporator fan is equal to the second power provided to the evaporator heater.

In some embodiments, the refrigeration unit comprises a plurality of remote evaporators. In some embodiments, the controller is configured to direct power to the plurality of the remote evaporators. In some embodiments, the controller is configured to direct equal power to the remote evaporators.

In some embodiments, a method comprises providing climate control, with refrigeration unit, the refrigeration unit comprising one or more components. The method further comprises providing power to the one or more components of the refrigeration unit with an electric motor operatively connected to a power source. The method further comprises generating a control signal, with a controller, to convert the electric motor to an electric generator. The method further comprises directing power generated by the electric motor to the one or more components of the refrigeration unit.

In some embodiments, the method further comprises directing the power generated by the electric motor directly to the one or more components of the refrigeration unit.

In some embodiments, the method further comprises directing variable power to the one or more components based on a power requirement of the one or more components.

In some embodiments, the refrigeration unit comprises a remote evaporator, the remote evaporator comprising an evaporator fan and an evaporator heater, and the method further comprises directing a first power to the evaporator fan and a second power to the evaporator heater.

In some embodiments, the first power provided to the evaporator fan is equal to the second power directed to the evaporator heater.

In some embodiments, the refrigeration unit comprises a plurality of remote evaporators, and the method further comprises directing equal power to the plurality of the remote evaporators.

In some embodiments, the method further comprises converting, with one or more power converters, power provided by the electric motor.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
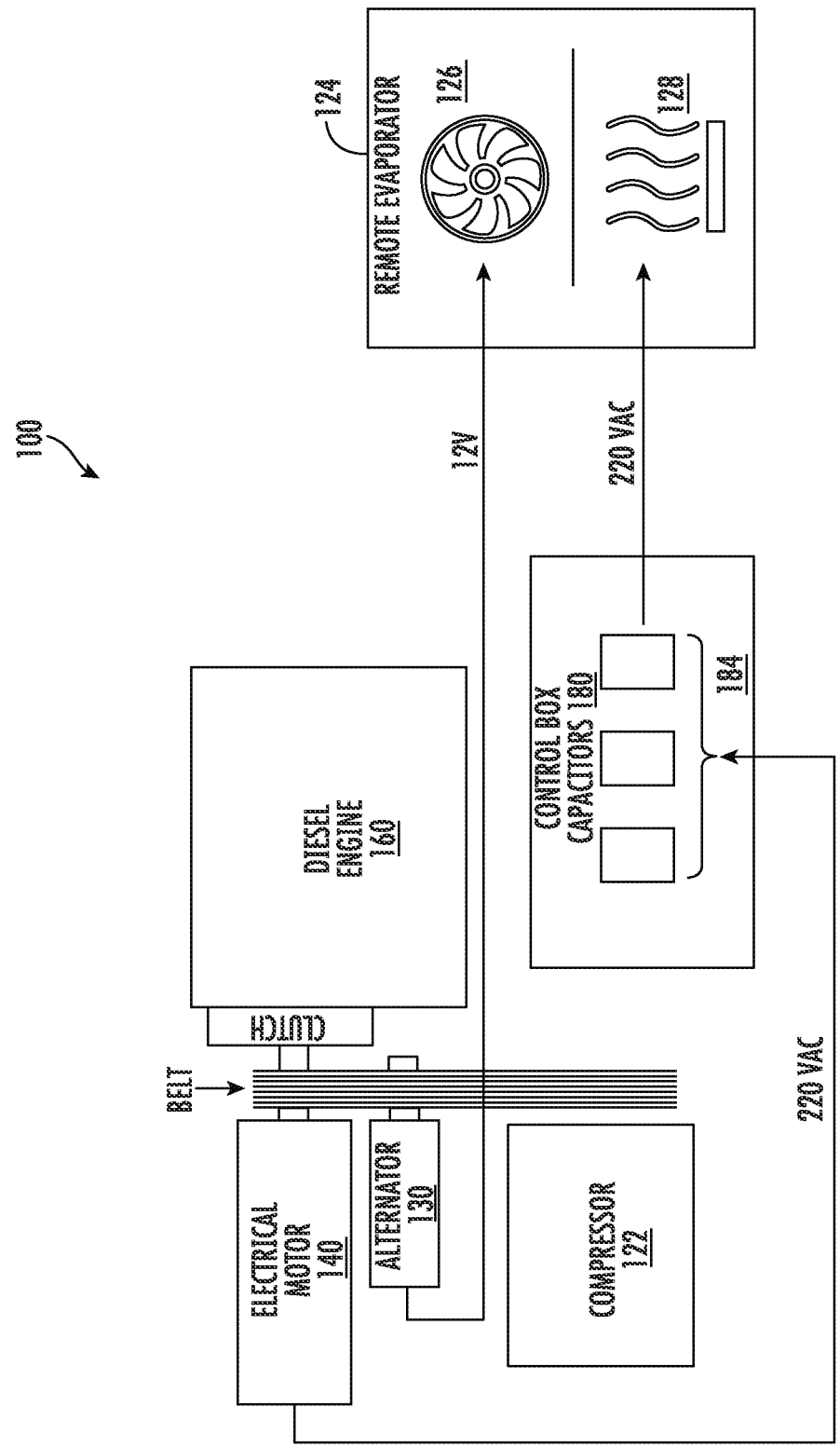
FIG. 1 shows an example of a traditional transport refrigeration system.

Generally, in some transport refrigeration systems, an electric motor may be used to provide power for the transport refrigeration system. FIG. 1 shows an example of such systems. Electrical motor 140 is generally connect to an engine 160 and to a control box 180. In these systems, remanence of electrical motor 140 is used to supply energy to remote evaporator 128. For example, if the electric motor is a 10 KW motor, only about 2-4 KW would be available to power the refrigeration unit. Furthermore, multiple capacitors may be needed to smooth power fluctuation from the electric motor. To manage the voltage and frequency from the electric motor, large and expensive capacitors are usually required. In the example shown in FIG. 1, three capacitors are needed to "clean-up" the voltage and frequency provided to heater 128 of remote evaporator 124. Evaporator fan 126, of remote evaporator 128, is powered by alternator 130. Generally, the power provided to evaporator fan 126 is limited to 12V. In some cases, because of the architecture of the transport refrigeration system (direct coupling between the engine and the motor) the right electrical motor RPM may be achieved only in a certain engine (e.g., 160) RPM speed. This may impact the overall performance of the refrigeration unit (e.g., in defrost or heat mode.) Generally, when diesel engines are used to power the electric motor, these engines need to be forced in low speed in order to get the needed electrical motor RPM, to provide the right voltage and frequency for the heaters.

The present disclosure, in accordance with some embodiments, describes a transport refrigeration system that uses a controller to control the electric motor to function as a generator. Converting the electric motor into a generator may allow for access to more power from the electric motor (e.g., if the electric motor is a 10 KW motor, a 10 KW may be available for powering the refrigeration unit). Additionally, embodiments of the present disclosure may provide a better control of current, voltage, and frequency (e.g., to power the remote evaporators) without the need of large and expensive capacitors. In some embodiments, the frequency and the voltage for powering the refrigeration unit are directly linked to the electric motor's RPM which makes more power available for the components of the refrigeration unit. In some embodiments, the controller may be configured to direct variable power to different components of the refrigeration unit based on their requirements (e.g., the heater and the fan of the remote evaporator may have different power demands). That said, not all embodiments necessarily provide all of these benefits, and some embodiments may provide other distinct advantages, which is not to suggest that any other feature described herein may not also be omitted in some embodiments.

Figure 2:
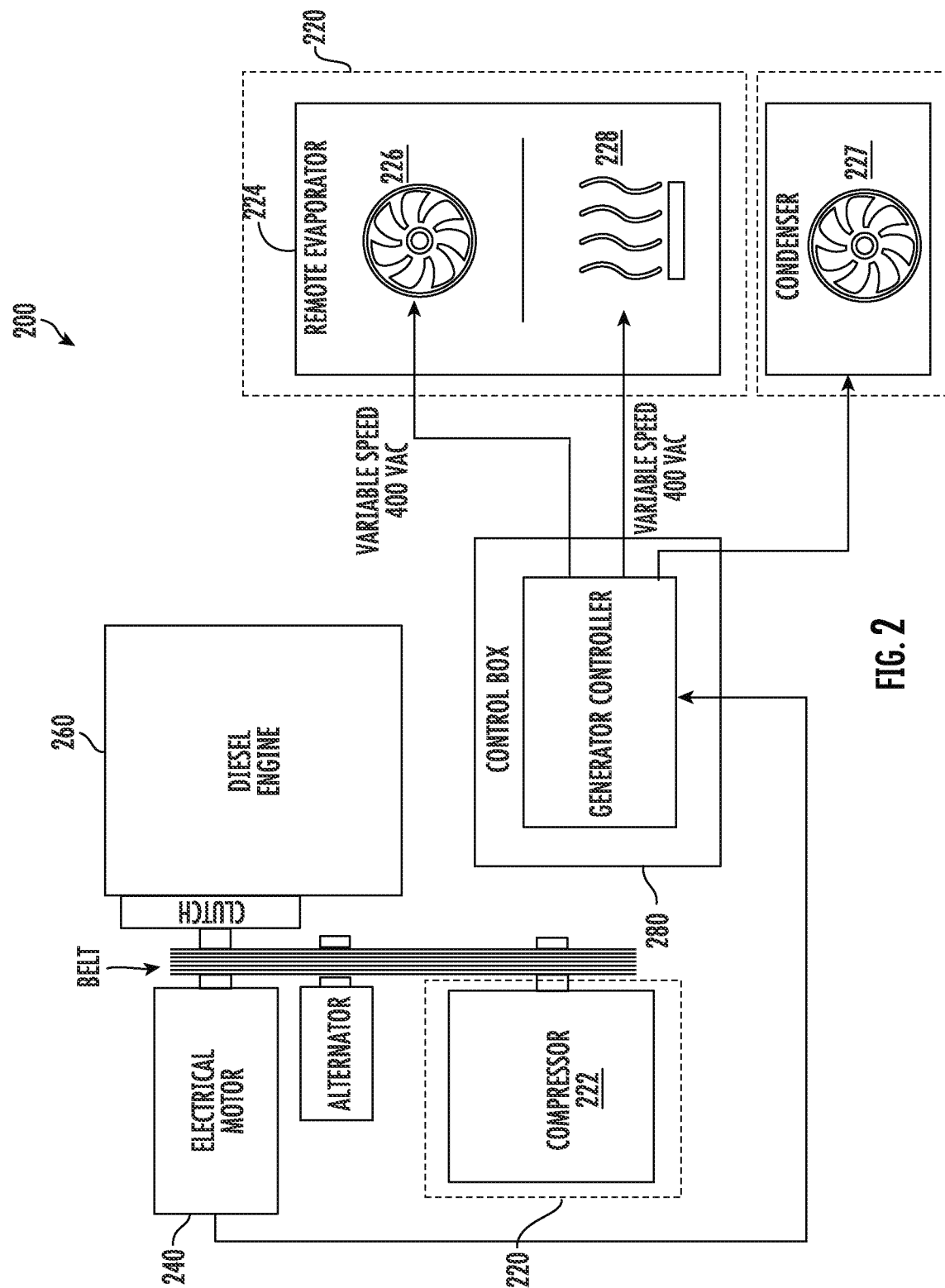
FIG. 2 shows an example of transport refrigeration system, in accordance with one or more embodiments.

FIG. 2 is a schematic illustration of a transport refrigeration system 200 in accordance with one or more embodiments. In some embodiments, transport refrigeration system 200 may include a refrigeration unit 220, an electric motor 240, an engine 260 for driving the electric motor 240, and a controller 280. In some embodiments, the refrigeration system 200 may include other components (e.g., alternator 230). Other components (not shown) known to one of ordinary skill in the art may be included in system 200 to facilitate operations of transport refrigeration system 200 in conjunction with the disclosed embodiments. For example, system 200 may include converters, inverters, transformers, battery packs, and/or other components.

In some embodiments, refrigeration unit 220 may be configured to establish and regulate a desired product storage temperature within a cargo space where a perishable product is stored during transport and to maintain the product storage temperature within a specified temperature range. In some embodiments, refrigeration unit 220 may be configured to provide climate control to multiple spaces. In some embodiments, the refrigerated spaces may require different cooling parameters (e.g., different temperatures). For example, the cargo spaces may include spaces for refrigerated items, and may include other spaces for frozen items. As explained below, the refrigeration unit 220 may include one or more remote components (e.g., remote evaporators 224) located in the different cargo spaces to provide climate control in these spaces. The remote components, in some embodiments, receive their power directly from electric motor 240 which is configured to function as an electric motor. In some embodiments, the refrigerated spaces may be included in the cargo box of a trailer, a truck, a seaboard shipping container or an intermodal container where perishable cargo, such as, for example, medicine, produce, meat, poultry, fish, dairy products, flowers, and other fresh or frozen perishable products, is stowed for transport.

In some embodiments, refrigeration unit 220 may include a compressor 222, one or more evaporators 224 associated with one or more fans (226), and/or other components (not shown). For example, refrigeration unit may include one or more of a condenser with associated condenser fans, an expansion device, electric heaters, and other components that facilitate operations of refrigeration unit 220. It is to be understood that other components (not shown) may be incorporated into refrigeration unit 220 as desired, including for example, but not limited to, control valves, a filter/dryer, an economizer circuit, and/or other components.

In some embodiments, compressor 222 may be configured to receive and compress refrigerant gas to higher temperature and pressure before providing it to other components of refrigeration unit 220 (e.g., condensers). In some embodiments, compressor 222 may comprise a single-stage or multiple-stage compressor such as, for example, a reciprocating compressor or a scroll compressor. In some embodiments, compressor 222 may have a compression mechanism (not shown) driven by an electric compressor motor. In an embodiment, the compressor motor may be disposed internally within the compressor with a drive shaft interconnected with a shaft of the compression mechanism, all sealed within a common housing of compressor 222.

In some embodiments, compressor 222, and other components of the transport refrigeration unit, may be powered, during transit, by engine 260. In some embodiments, engine 260 may be a stand-alone engine (e.g., a diesel engine), or may be the engine of the transport (e.g., in the case of mechanically driven transport). In some embodiments, compressor 222 may be driven by engine 260, either through a direct mechanical coupling or a belt drive 265. In some embodiments, compressor 222 may be driven by an AC synchronous generator, that generates AC power, driven by engine 260. In some embodiments, electric motor 240 may be configured to power compressor 222. In some embodiments, as explained below, controller 280 may be configured to control electric motor 240 to function as a generator to provide power to one or more components of system 200 (e.g., compressor 222). In some embodiments, electric motor 240 may be configured to generate AC power that may be used to power an electric compressor motor for driving compressor 222 of the transport refrigeration unit 220, electric AC fan motors, condenser and evaporator motors, electric heaters associated with the remote evaporator 224, and/or powering other components of refrigeration unit 220. In some embodiments, controller 280 may be configured to direct power from electric motor 240 to one or more of these components based on their power requirements.

In some embodiments, evaporators 224 may include one or more remote evaporators. The remote evaporators may be located in different cargo spaces. In some embodiments, the remote evaporators may be configured to provide different climate controls to the different cargo spaces. In some embodiments, remote evaporator 224 may include an associated evaporator fan 226 and a heat exchanger 228. In some embodiments, heat exchanger 228 may comprise one or more refrigerant conveying coiled tubes or one or more tube banks formed of a plurality of refrigerant conveying tubes extending between respective inlet and outlet manifolds. In some embodiments, evaporator fan 226 may be configured to pass air drawn from the temperature-controlled cargo space across the tubes of heat exchanger 228 to heat and evaporate refrigerant liquid passing through the tubes and cool the air. The air cooled in traversing the heat exchanger 228 is supplied back to the temperature-controlled cargo space. It is to be understood that the term "air" when used herein with reference to the atmosphere within the cargo space includes mixtures of air with other gases, such as for example, but not limited to, nitrogen or carbon dioxide, sometimes introduced into a refrigerated cargo box for transport of perishable produce.

In some embodiments, the one or more remote evaporators may be configured to receive power directly from electric motor 240. For example, controller 280 may direct power generated by electric motor 240 to each of the one or more remote evaporators. In some embodiments, the one or more evaporators 224 may receive equal power from electric motor 240. In some embodiments, the one or more evaporators 224 may receive variable power generated by electric motor 240 depending on their requirements (or the requirements of the refrigerated cargo space the climate of which they control). In some embodiments, the one or more components of the remote evaporators 224 (e.g., fans and heat exchangers of the remote evaporators) may receive power generated by electric motor 240 directly from the electric motor 240 (directed by controller 280). In some embodiments, the one or more components of evaporators 224 may receive equal or different power generated by electric motor 240. For example, in some embodiments, the evaporator fan 226 may require and receive the same power as the heat exchanger 228. In some embodiments, evaporator may require a different power than heat exchanger 228, in this case controller 280 may direct the amount of power needed by the fan (or the heat exchanger) and generated by electric motor 240. For example, in some embodiments, electric motor 240 may generate power range from about 200 V AC to 600 V AC. In some embodiments, for example, a power of about 460 VAC may be directed by controller 280 to the heat exchanger 228 and/or fan 226. In some embodiments, where electric motor 240 generates DC power, controller 280 may be configured to direct a power between about 12 VDC and 60 VDC.

In some embodiments, electric motor 240 is configured to provide power to one or more components of system 200. In some embodiments, electric motor 240 may be mechanically coupled to engine 260 (e.g., through belt 265). For example, a shaft of the electric motor 240 may be driven (receives energy from) by a drive shaft of the engine 260. In some embodiments, electric motor 240 may be configured to provide multi-phase and/or single-phase power to simultaneously supply the electrical requirements of the different components of refrigeration system 200. In some embodiments, electric motor 240 may be configured to operate as an electric generator. In some embodiments, engine 260 may be operatively connected to a motor shaft of electric motor 240 which may allow the electric motor 240 to function as a generator (by rotating the shaft). In some embodiments, electric motor 240 may be configured to operate as a generator as a result of an increase of the motor speed. In some embodiments, controller 280 may be configured to control operations of electric motor 240 to function as an electric generator. In some embodiments, controller 280 may be configured to control current, speed, and/or torques of the electric motor 240 to generate power. For example, in some embodiments, controller 280 may be configured to increase the running speed of the motor to convert electric motor 240 to a generator. In some embodiments, controller 280 may be configured to generate a control signal that sends a small amount of power to the brush of the motor to generate magnetic reluctance and transform the electrical motor to a generator.

In some embodiments, the electric motor 240 may comprise a single on-board, engine driven AC generator configured to generate alternating current (AC) power including at least one AC voltage at one or more frequencies. In some embodiments, the electric motor 240 may, for example, be a permanent magnet AC generator or a synchronous AC generator. In another embodiment, the electric motor 240 may comprise a single on-board, engine driven DC generator configured to generate direct current (DC) power at least one voltage. In some embodiments, electric motor 240 may have internal voltage regulators. In some embodiments, refrigeration system 200 may include a voltage sensor (not shown) to sense the voltage of the electric motor 240. In some embodiments, different components of system 200 may have different power demands (e.g., AC or DC), various power converters (e.g., AC to DC rectifiers, DC to AC inverters, AC to AC voltage/frequency converters, and DC to DC voltage converters, etc.) may be used in connection with the electric motor 240 as appropriate.

In some embodiments, electric motor 240 (functioning as an electric generator) may be configured to output between about 200 volts of alternating current (VAC) to 600 VAC. In some embodiments, in the case of DC power generation, electric motor 240 may be configured to output about 12 VDC to 60 VDC. For example, a power of between about 200 and 600 VAC may be available and directed to power the one or more remote evaporators; heat exchanger 228 and/or fan 226 of remote evaporator 224; and/or to power other components of system 200.

In some embodiments, controller 280 may be configured for controlling operations of the refrigeration system 200. In some embodiments, controller 280 may be an electronic controller including a microprocessor and memory. In some embodiments, controller 280 may be configured to control refrigeration unit 220 to provide and maintain a desired thermal environment within the refrigerated compartments of the truck or trailer in which a perishable product is stowed. In some embodiments, controller 280 may be in operative communication with electric motor 240, and refrigeration unit 220. For example, controller 280 may be configured to control operation of one or more components of refrigeration unit 220 (e.g., compressor 222, evaporators 224, fans (226), condensers, condenser fans, electric heaters, valves, etc.). For example, in some embodiments, controller 280 may be configured to control variable power/speed for condenser fans 227. In some embodiments, controller 280 may configured to control operations of remote evaporator fan 226 and/or heat exchanger 228. In some embodiments, controller 280 may be configured to receive one or more signals indicating operation states of various components of refrigeration unit 220 and determines the power requirements for each component (e.g., received from sensors in the refrigeration unit).

In some embodiments, controller 280 may be configured to control operations of electric motor 240 to provide power to different components of system 200. In some embodiments, controller 280 may be configured to control electric motor 240 to direct power based on the indicated requirement of the different components. In some embodiments, controller 280 may control operations of electric motor 240 through a power supply interface (not shown). In some embodiments, controller 280 may be configured to generate a control signal to convert the electric motor to an electric generator. In some embodiments, controller 280 may be configured to control current, speed, and/or torques of the electric motor 240 to generate power. For example, in some embodiments, controller 280 may be configured to increase the running speed of the motor to convert electric motor 240 to a generator. In some embodiments, controller 280 may be configured to generate a control signal that sends a small amount of power to the brush of the motor to generate magnetic reluctance and transform the electrical motor to a generator. In some embodiments, controller 280 may be configured to direct a power of between about 200 and 600 VAC to power the one or more remote evaporators; heat exchanger 228 and/or fan 226 of remote evaporator 224; and/or to power other components of system 200.

In some embodiments, engine 260 may be configured to drive the electric motor 240, which generates electrical power. In some embodiments, engine 260 may be configured to drive a compressor motor. In some embodiments, the engine 260 may be an on-board fossil-fuel engine or a multi-fuel capable engine that can run on propane, compressed natural gas, liquefied natural gas, gasoline, and/or other type of fuel. In some embodiments, engine 260 may be a spark ignited engine.

Figure 3:
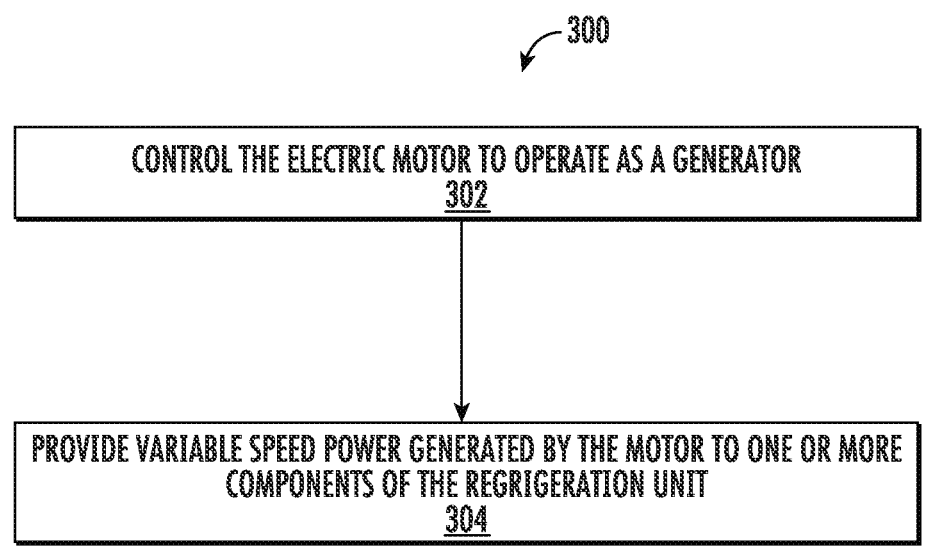
FIG. 3 shows a chart of a method of power control in a transport refrigeration system, in accordance with one or more embodiments.

FIG. 3 Illustrates a method 300 for power control in a transport refrigeration system, in accordance with one or more embodiments of the present disclosure.

At an operation 302 of method 300, variable speed power generated by the motor is provided to one or more components of the refrigeration unit. In some embodiments, operation 302 may be performed by a controller, the same as or similar to controller (280) (shown in FIG. 1 and described herein).

At an operation 304 of method 300, controlling the electric motor to operate as generator. In some embodiments, power generated by the electric motor is provided directly to the one or more components of the refrigeration unit. In some embodiments, power is provided to the one or more components based on a power requirement of the one or more components. In some embodiments, a first power may be provided to a remote evaporator fan and a second power may be provided to the evaporator heater. In some embodiments, the evaporator fan is equal to the second power provided to the evaporator heater. In some embodiments, equal power may be provided to a plurality of remote evaporators. In some embodiments, operation 302 may be performed by a controller, the same as or similar to controller (280) (shown in FIG. 1 and described herein).

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A transport refrigeration system, the system comprising:
   a refrigeration unit, the refrigeration unit comprising one or more components;
   an electric motor operatively connected to a power source; and
   a controller operatively connected with the electric motor and the one or more components of the refrigeration unit, wherein the controller is configured to:
   generate a control signal that sends power to the electric motor to generate magnetic reluctance and convert the electric motor to an electric generator; and
   direct power generated by the electric motor through the controller to the one or more components of the refrigeration unit.

2. The transport refrigeration system of claim 1, wherein the controller is configured to direct variable power to the one or more components based on a power requirement of the one or more components of the refrigeration unit.

3. The transport refrigeration system of claim 1, wherein the refrigeration unit comprises a remote evaporator, the remote evaporator comprising an evaporator fan and an evaporator heater, and wherein the controller is configured to direct a first power to the evaporator fan and a second power to the evaporator heater.

4. The transport refrigeration system of claim 3, wherein the controller is configured such that the first power provided to the evaporator fan is equal to the second power provided to the evaporator heater.

5. The transport refrigeration system of claim 1, wherein the refrigeration unit comprises a plurality of remote evaporators, and wherein the controller is configured to direct equal power to an evaporator fan and an evaporator heater associated with the plurality of the remote evaporators.

6. The transport refrigeration system of claim 1, wherein the refrigeration unit comprises one or more of a compressor, a condenser, and control valves.

7. The transport refrigeration system of claim 1, further comprising one or more power converters configured to convert the power provided by the electric motor.

8. A method, comprising:
providing climate control, with a refrigeration unit, the refrigeration unit comprising one or more components;
providing power to the one or more components of the refrigeration unit with an electric motor operatively connected to a power source;
generating a control signal, with a controller operatively connected with the electric motor and one or more components of the refrigeration unit, to send power to the electric motor to generate magnetic reluctance and convert the electric motor to an electric generator; and
directing power generated by the electric motor through the controller to the one or more components of the refrigeration unit.

9. The method of claim 8, further comprising:
directing variable power to the one or more components based on a power requirement of the one or more components.

10. The method of claim 8, wherein the refrigeration unit comprises a remote evaporator, the remote evaporator comprising an evaporator fan and an evaporator heater, and wherein the method further comprises:
directing a first power to the evaporator fan and a second power to the evaporator heater.

11. The method of claim 10, wherein the first power directed to the evaporator fan is equal to the second power provided to the evaporator heater.

12. The method of claim 8, wherein the refrigeration unit comprises a plurality of remote evaporators, and wherein the method further comprises providing equal power to an evaporator fan and an evaporator heater associated with the plurality of the remote evaporators.

13. The method of claim 8, further comprising:
converting, with one or more power converters, the power provided by the electric motor.

* * * * *